(12) United States Patent
Geva et al.

(10) Patent No.: US 9,928,450 B2
(45) Date of Patent: Mar. 27, 2018

(54) AUTOMATED APPLICATION INTERACTION USING A VIRTUAL OPERATOR

(71) Applicant: International Business Machines Corporation, Armonk, NY (US)

(72) Inventors: Amir Geva, Yokneam (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/292,947

(22) Filed: Jun. 2, 2014

(65) Prior Publication Data
US 2014/0307969 A1   Oct. 16, 2014

Related U.S. Application Data

(63) Continuation of application No. 12/555,821, filed on Sep. 9, 2009, now abandoned.

(51) Int. Cl.
| | |
|---|---|
| *H03M 13/19* | (2006.01) |
| *G06K 9/72* | (2006.01) |
| *G06F 11/34* | (2006.01) |
| *G06F 21/36* | (2013.01) |
| *G06F 21/52* | (2013.01) |
| *G06Q 10/10* | (2012.01) |
| *G06F 3/0481* | (2013.01) |
| *G06K 9/00* | (2006.01) |

(52) U.S. Cl.
CPC ............. *G06K 9/72* (2013.01); *G06F 3/0481* (2013.01); *G06F 11/3414* (2013.01); *G06F 21/36* (2013.01); *G06F 21/52* (2013.01); *G06K 9/00442* (2013.01); *G06Q 10/10* (2013.01)

(58) Field of Classification Search
CPC .... G06K 9/00369; G06K 9/72; G06Q 20/042; G06Q 40/00; G06F 3/0489; G06F 3/0481; G06F 11/3414; H04W 4/102
USPC .............................................................. 705/3
See application file for complete search history.

(56) References Cited

U.S. PATENT DOCUMENTS

| | | | | |
|---|---|---|---|---|
| 5,576,734 | A * | 11/1996 | Daniele | G06F 3/023 341/22 |
| 6,913,199 | B2 * | 7/2005 | He | 235/454 |
| 8,171,406 | B1 * | 5/2012 | Newstadt | G06F 9/4443 715/700 |
| 2003/0193479 | A1 * | 10/2003 | DuFaux | G06F 3/0421 345/168 |
| 2005/0022137 | A1 * | 1/2005 | Fushikida | 715/823 |

(Continued)

*Primary Examiner* — Hiep V Nguyen
(74) *Attorney, Agent, or Firm* — Daniel Kligler

(57) ABSTRACT

A computer-implemented method for automating interaction with a computer system includes linking a control computer system to an input interface and to an output interface of a client computer system, which is operative for producing user interface images on a display device. The control computer system executes distinct software modules that include a virtual operator for simulating actions of a human operator. Execution of the software modules causes the control computer system to capture an image from the output interface, and to recognize information in the image. In response to the information, the virtual operator controls an input device to automatically execute predetermined operations on the client computer system via the input interface.

14 Claims, 5 Drawing Sheets

(56) References Cited

U.S. PATENT DOCUMENTS

| | | |
|---|---|---|
| 2005/0044450 A1 | 2/2005 | Nakata |
| 2005/0080649 A1 | 4/2005 | Alvarez |
| 2005/0137910 A1 | 6/2005 | Rao |
| 2007/0095894 A1* | 5/2007 | Kerridge ........................ 235/379 |

* cited by examiner

FIG. 2

ACME INSURANCE CORPORATION - POLICY HOLDER SCREEN

INQ100

POLICY NUMBER . . . >

HOLDER NAME . . . . :
ADDRESS LINE 1 . . . :
ADDRESS LINE 2 . . . :
CITY / STATE / ZIP . :

TRANSACTION NO.   ACTIVITY CODE   DATE   REVISED BALANCE

F3=EXIT F10=MANAGER F12=CANCEL F14=UPDATE BALANCE F16=PRINT F20=DELETE

AUTOMATED APPLICATION INTERACTION USING A VIRTUAL OPERATOR

CROSS-REFERENCE TO RELATED APPLICATION

This application is a continuation of U.S. patent application Ser. No. 12/555,821.

CROSS-REFERENCE TO RELATED APPLICATIONS

This application is a continuation-in-part of application Ser. No. 11/426,949, titled "SYSTEM, METHOD AND COMPUTER PROGRAM PRODUCT FOR PERFORMING INFORMATION TRANSFER USING A VIRTUAL OPERATOR," filed Jun. 28, 2006, which is incorporated herein by reference.

FIELD OF THE INVENTION

The present invention relates generally to software solutions and specifically to providing automatic interaction among business software applications using a virtual operator.

BACKGROUND OF THE INVENTION

Modern organizations typically employ interactive business software solutions, including multiple operative products that may support diverse business units. Such products typically include software applications to provide support for business requirements, e.g., financial operations, customer relationship management, human resources, professional services, purchasing, and distribution.

The software applications may run on computerized systems, which can include legacy as well as modern systems. Often, at least a portion of the software and hardware of the computerized systems are tailored to support customized customer-specific functionality. Customizations may be applied at the time a new application is obtained, or as business needs change. Techniques utilized to enable a given system to be customized range from source code customization by professional services experts to interactive tool based approaches that allow end customers to make some changes themselves. At the end of the day, regardless of whether the software applications are "out-of-the-box", customized, legacy or modern, they all need to be interactive to allow the data in each system to be accessible, shareable, and consistent.

BRIEF SUMMARY

An embodiment of the present invention provides a computer-implemented method for automating interaction with a computer system, which is carried out by linking a control computer system to an input interface of a client computer system and to an output interface of the client computer system, which is operative for producing user interface images on a display device. Distinct software modules are executed with the control computer system, including a virtual operator for simulating actions of a human operator. Execution of the software modules causes the control computer system to capture an image from the output interface and to recognize information in the image. In response to the information, the virtual operator controls an input device to automatically execute predetermined operations on the client computer system via the input interface.

Other embodiments of the invention provide computer software product and apparatus for carrying out the above-described method. Still other embodiments of the invention provide techniques for configuring a computer software product for carrying out the above-described method cooperatively with computer apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 2 shows a user interface screen, which displays a user interface image, in accordance with a disclosed embodiment of the invention;

DETAILED DESCRIPTION OF EMBODIMENTS

Overview

Figure 1:
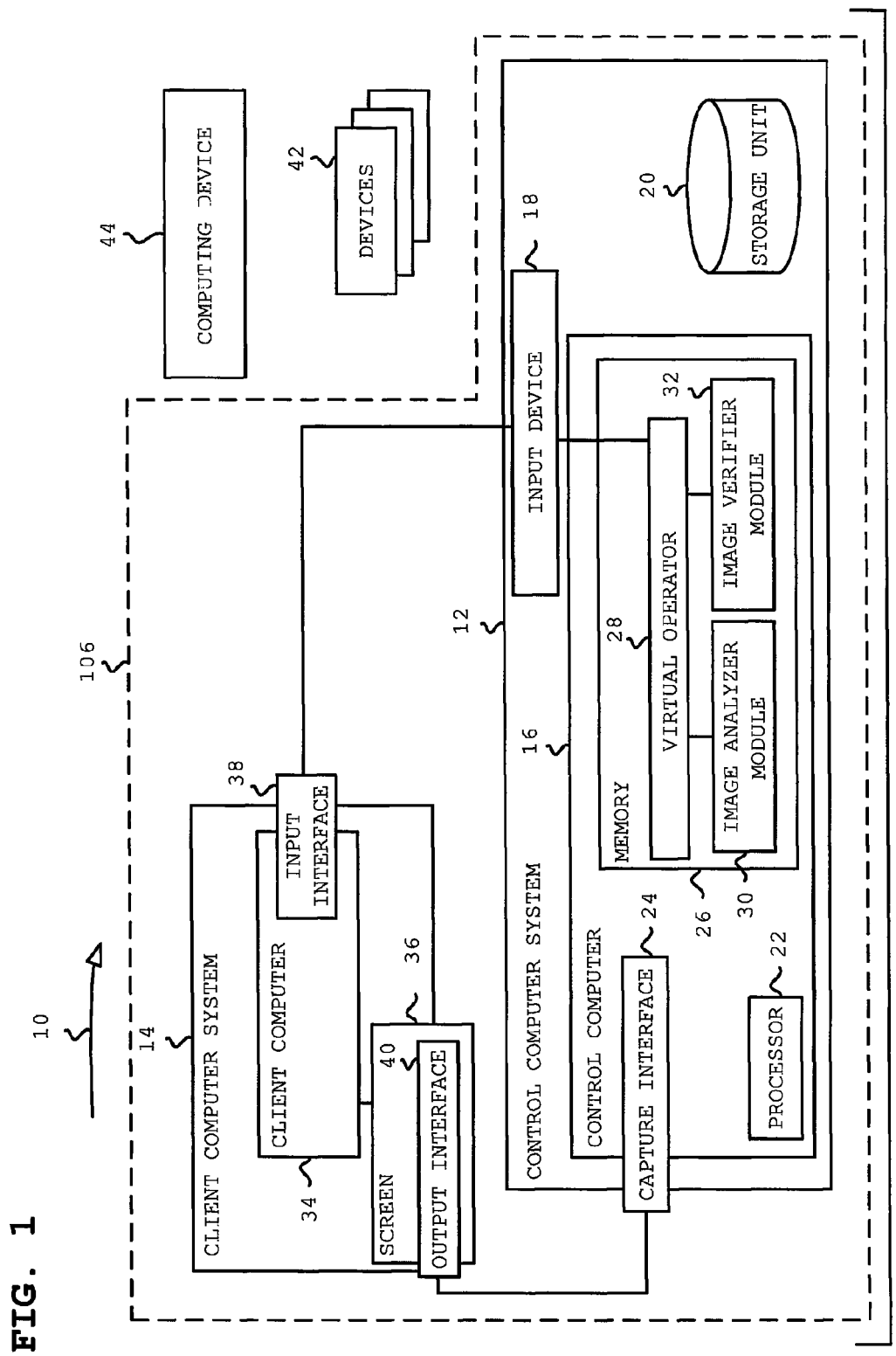
FIG. 1 is a block diagram of a system for automating interaction with a computer system, in accordance with a disclosed embodiment of the invention.

Embodiments of the present invention that are described hereinbelow provide improved methods, products and systems for automating interaction with a computer system. When integrating multiple modern software systems with legacy software systems, for example, it is a primary goal to maximize the efficiency of the integration by minimizing the effort necessary for data to flow among the systems.

In the past, approaches to the issue have included manual data updates and queries to the legacy software systems, wherein human operators have prepared data in the required format, and have manually keyed the prepared data into the legacy software systems. This approach has proven to be costly in terms of resources, suffers from poor throughput, and is typically inaccurate. Another historical approach has been to replace the legacy software systems with new computerized systems designed to accurately integrate the data flow while providing the necessary functionality. This approach has proven to be quite expensive, wherein the replacement systems take significant resources to develop, often fail to meet the objectives of the design, and are typically provided later than scheduled.

Yet another approach from the past has been to develop automated processes to convert data off-line, e.g., the processes are scheduled to operate during non-production hours, changing data in a modern format to a format acceptable to the legacy software systems. One drawback of this historical approach includes a lack of direct connectivity among the modern and legacy software systems. For example, verification that a client address stored in a legacy software system is accurate can take an unacceptably long time. This approach has also proven to be extremely expensive from a strategic point of view, as the conversion processes are typically "hard-wired", or precisely tailored to match the data structures of the legacy software systems. Constant updates to the conversion processes are required as the modern software systems evolve.

Embodiments of the present invention provide a virtual operator that emulates actions performed by a human operator using legacy software. The virtual operator interacts with the legacy software via an automated software system interfacing between modern and legacy software systems, or simply among any number of non-integrated software systems. In the context of the present patent application and claims, the term "virtual operator" refers to any software application or process that is capable of automatically performing actions on computer systems by interaction with a user interface, thus simulating identical actions performed by a human operator. In the context of the present patent application and claims, the term "legacy software system" refers to any software application that executes on a computer system and that continues to be used in spite of available newer technology, typically since the software application still meets the requirements of at least some of the users of the software application.

In embodiments of the invention, a control computer system is linked to input and output interfaces of a client computer system that executes legacy computer software. The client computer system produces user interface images on a display device, typically in response to data entered via the input interface, e.g., using a keyboard or mouse. A virtual operator running on the control computer system simulates actions of a human operator, as described hereinbelow. The virtual operator captures one of the images from the output interface, and recognizes information in the image. Typically, the virtual operator uses an image analyzer to compare the image with a collection of image templates. In one example, the image analyzer uses optical character recognition (OCR) to analyze the image. In another example, complex processes such as creating hierarchical relationships among areas of the screen may be used in order to apply disambiguation via semantic entity identification.

In some embodiments, the virtual operator verifies that the recognized information matches a known pattern. An image verifier is typically used to corroborate the match by extracting some type of marker from the image, such as text indicative of a screen function. For example, an image template may be used to make comparisons using the screen title text to identify the image. In another example, the image verifier may confirm that the currently displayed image on the display device of the client computer system is an address change screen.

The virtual operator controls the input device, automatically executing predetermined operations on the client computer system. The input device is typically used to input entry data comprising simulated keystrokes, mouse clicks, and other operator actions according to an input script, as described hereinbelow. In the present example, entry data is input to the input interface of the client computer system via the input device to change a customer address. Alternatively, predetermined operations may be executed to simulate other human operator actions, to query legacy software systems, or to insert and update data, as required. Embodiments of the present invention provide a single reliable, high-speed interface among multiple software systems, such as between a modern software system and a legacy software system.

System Description

Reference is now made to FIG. 1, which is a block diagram that schematically illustrates a system 10 for automating interaction with a computer system, in accordance with a disclosed embodiment of the invention. System 10 typically comprises a control computer system 12 and at least one client computer system 14. Control computer system 12 may interface with multiple client computer systems, which are not shown for the sake of simplicity. Although portions of system 10 shown in FIG. 1 and other drawing figures herein are shown as comprising a number of separate functional blocks, these blocks are not necessarily separate physical entities, but rather may represent, for example, different computing tasks or data objects stored in a memory that is accessible to a processor of control computer system 12. Embodiments of the present invention enable control computer system 12 to automatically interact with the multiple client computer systems irrespective of their hardware and software configurations, as described hereinbelow. Control computer system 12 typically comprises a general-purpose control computer 16, which is programmed in software to carry out the functions that are described herein. Control computer system 12 also comprises an input device 18 and a storage unit 20, as described hereinbelow.

Control computer 16 comprises a processor 22, a capture interface 24, and a memory 26. Capture interface 24 may comprise a Bluetooth® adapter, an Infrared Data Association (IrDA) device, a cable connection, or any communication interface for capturing image data that allows control computer 16 to receive output from a screen, e.g., in the form of an image bitmap. A virtual operator 28, an image analyzer module 30, and an image verifier module 32 are held in memory 26. Virtual operator 28, image analyzer module 30, and image verifier module 32 may be downloaded to control computer 16 in electronic form, over a network, for example, or they may alternatively be provided on tangible media, such as optical, magnetic or electronic memory media. Further alternatively, at least some of the functions of control computer 16 may be carried out by dedicated electronic logic circuits. Although the embodiment relates to one particular system for automating interaction with a computer system, the principles of automated interaction that are implemented in system 10 may similarly be applied, mutatis mutandis, in other types of automated computer interaction systems using other techniques for automatically inputting entry data to client computer systems.

Input device 18 may comprise any suitable device or device simulator that allows control computer 16 to produce a sequence of device signals such as keyboard keystrokes or mouse clicks for input to a communications interface, which is typically connected to another computer system. One example of a suitable input simulator is the Microsoft Windows™ SendInput function for the Windows user interface, available at the Microsoft Developer Network website (msdn.microsoft.com). The SendInput function provides a tool to support simulation of keystrokes, mouse motions, and button clicks. Storage unit 20 may be any storage device that is capable of storing images captured by capture interface 24, image templates, and any other data stored for retrieval by virtual operator 28.

Client computer system 14 typically comprises a general-purpose client computer 34, which is programmed in software to carry out the functions that are described herein. Client computer system 14 also comprises a screen 36, as described herein. Client computer 34 comprises an input interface 38, which may comprise any suitable communications interface that receives input signals representative of actions performed using input devices such as keyboards and computer mice. Input device 18 may provide simulated input, and as described hereinbelow, software applications may be used to enable remote control of client computer system 14 over a network. Thus embodiments of the present invention provide interoperability between client computer system 14 and input device 18 without necessitating any modifications to input interface 38. Screen 36 comprises a display device and an output interface 40, which may comprise a Bluetooth® adapter, an Infrared Data Association (IrDA) device, a cable connection, or any communication interface for outputting image data that allows client computer 34 to export visual display data, e.g., in the form of a compressed image.

System 10 may include devices 42 for producing a software product on a computer-readable medium, for example a CD or DVD writer. Devices employing many other technologies are also suitable for use as devices 42, for example, writers adapted to tapes, hard disc drives, RAM, ROM, flash memory devices, floppy drives, programmable read-only memory (PROM), erasable programmable read-only memory (EPROM), and magneto-optical discs. In all of these technologies patterns or transitions in the physical state of the medium are formed therein. These patterns and sequences of transitions encode instructions or data, e.g., binary numbers that are acceptable to the processor. The nature of the state transitions varies with the particular medium, and includes changes in magnetic domains in magnetic media, formation of pits or bumps on an optical disk, etc. Once the transitions are established, the medium may be transferred to another computing device 44, which is capable of reading the medium, recognizing the transitions, and decoding them to identify executable instructions or data.

In an alternative embodiment of the present invention, control computer system 12 and client computer system 14 may run on a single computer system 106 as separate processes. Communication between the systems may comprise events passed between the separate processes via any suitable application programming interface known in the art. The present embodiment provides for simplified image capture and input signal generation due to the processes running on single computer system 106, while eliminating the need to physically link multiple computer systems.

Reference is now made to FIG. 2, which is a schematic, pictorial illustration of a user interface screen, which displays user interface images, in accordance with a disclosed embodiment of the invention. Client computer 34 (FIG. 1) presents a user interface image 46 having application data fields 48 on screen 36. For the purposes of illustration, image 46 is described using an example of an action performed on a software application to determine policy holder data in association with an insurance policy maintained in a legacy software system. Image 46 comprises a screen function label 50, a policy number field 52, a policy holder name field 54 and data fields 48.

Client computer system 14 (FIG. 1) is adapted to execute at least one software application. The software application may be responsive to input operations, e.g., by signals sent to input interface 38, as described in more detail hereinbelow. In the present example, the software application provides storage and maintenance functionality for policy holder data for an insurance firm. Typically, the software application generates images such as image 46 that are then displayed on screen 36 in response to the actions. For example, a logon session can involve performing multiple actions in the predetermined order required to enter login and password information.

The software application may require additional input operations that cause client computer 34 (FIG. 1) to display a different image on screen 36. Virtual operator 28 typically captures the image from screen 36 or from output interface 40, using any image capture method known in the art. Virtual operator 28 uses image analyzer module 30 to recognize information in the image. A pseudocode listing of a sample image analysis that may be used in the context of the present example, whereby the software application is running on a mainframe computer, is presented hereinbelow in Listing 1. Function find_nearest in Listing 1 tries to locate each application data field based upon relative coordinates of the data field, for example, policy number field 52.

Image verifier module 32 (FIG. 1) is used to confirm that the recognized information matches a pattern that is known to virtual operator 28, as described hereinabove. A pseudocode listing of a sample screen recognition routine that may be used in this context is presented hereinbelow in Listing 2. In the present example, the image contains a marker describing the function of the image, in the text of screen function label 50. A pseudocode listing of a sample screen verification routine that may be used in this context is presented hereinbelow in Listing 3. In the present example, screen function label 50 is verified to match expected screen function label values.

Typically, the software application provides some images that allow information entry, whereas other images are displayed that only allow information to be viewed. Some of the images provided by the software application may indicate to virtual operator 28 (FIG. 1) that information entry has been completed. The input operations required for executing actions for each software application are known in advance, in the form of the above-noted input script, which is typically stored in storage unit 20.

Automatic Application Interaction

Figure 3:
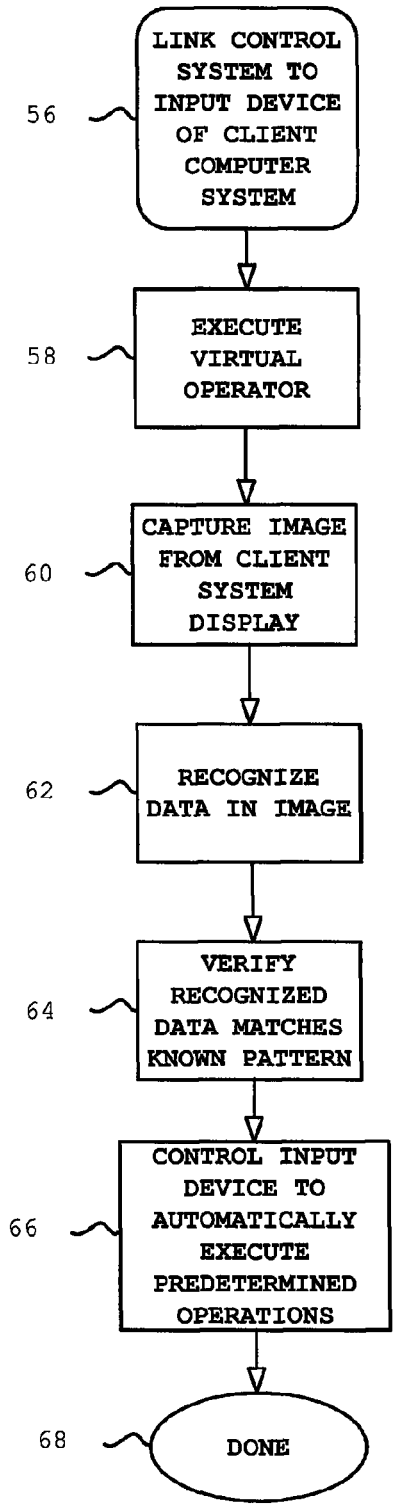
FIG. 3 is a flow chart of a method for automating interaction with a computer system, in accordance with a disclosed embodiment of the invention.

Reference is now made to FIG. 3, which is a flow chart that schematically illustrates a method for automating interaction with a computer system, in accordance with a disclosed embodiment of the invention. Shown by way of example, the name of a policy holder at an insurance firm may need to be changed due to an update in the marital status of the policy holder. Virtual operator 28 would therefore need to simulate several actions of a human operator in order for to automatically interact with a legacy software application running on client computer system 14 to successfully negotiate the requirement.

Control computer system 12 (FIG. 1) is linked to client computer system 14 in a computer system linking step 56. Typically, input device 18 is linked to input interface 38, and output interface 40 is linked to capture interface 24.

Control computer system 12 (FIG. 1) executes virtual operator 28 to simulate actions of a human operator, thus automatically interacting with the software application running on client computer system 14, in a virtual operator executing step 58. Virtual operator 28 (FIG. 1) causes processor 22 to perform the steps listed hereinbelow.

Capture interface 24 (FIG. 1) captures an image, e.g., image 46 displayed on screen 36 (FIG. 2) in an image capturing step 60. Additionally or alternatively, image 46 may be captured by capture interface 24 via output interface 40. In the current example, output interface 40 is a universal serial bus (USB), and image 46 is captured from the software application.

As described hereinabove, image analyzer module 30 may be invoked by virtual operator 28 (FIG. 1) to analyze image 46. Image analyzer module 30 recognizes information in image 46 in an information recognition step 62, as described hereinabove in reference to the pseudocode listing presented in Listing 1. A simple text layout is easily recognized by image analyzer module 30, while comparing image 46 to image templates stored in storage unit 20. The example provided by image 46 (FIG. 2), taken from a sample mainframe computer application, may be analyzed with ease by image analyzer module 30. However, more complex analyses may be required if geometric primitives, e.g., rectangles or lines, are utilized by the software application running on client computer system 14, as described hereinabove.

Virtual operator 28 (FIG. 1) typically uses image verifier module 32 to verify that the recognized information matches a known pattern in a recognized information pattern matching verification step 64. In the current example, image verifier module 32 verifies that the marker describing the function of image 46 matches the image template used by image analyzer module 30 in information recognition step 62. Screen function label 50 (FIG. 2), the marker in the present example, has the value "INQ100", and is verified against the image template by image verifier module 32, thus confirming the identification of image 46 as matching the known pattern of the address change screen of the software application delineated by the image template.

Virtual operator 28 responds to the pattern verification by image verifier module 32, by controlling input device 18 to automatically execute predetermined operations on client computer system 14 in a device controlling and operation executing step 66. These operations may be specified in an input script. A library of such input scripts may be stored in storage unit 20. A pseudocode listing of routines to generate data input that may be used in this context is presented hereinbelow in Listing 4. Virtual operator 28 causes input device 18 to automatically execute predetermined operations, e.g., inputting entry data to client computer system 14, thereby simulating actions of the human operator. In an embodiment of the present invention, virtual operator 28 uses RealVNC© server and client software applications, available from RealVNC Ltd, Betjeman House, 104 Hills Road, Cambridge. Cambridgeshire, CB2 1LQ. UK, to control client computer system 14 over a network. The RealVNC applications utilize remote framebuffer (also known as Remote Frame Buffer or RFB) functionality, a protocol which provides remote access to graphical user interfaces at the framebuffer level, and is available from the RealVNC web site (realvnc.com). Thus, the RealVNC applications provide the ability to send the output of input device 18 to input interface 38 and to place device events into the input event queue of the operating system of client computer system 14. The device events are then processed on client computer system 14 as though a physical input device had been used to generate the events.

Each input script provides entry data for performing actions that have been precisely tailored to execute operations for a specific software application on a particular computer system via input device 18. In the present example, the entry data comprises keystrokes and mouse clicks input by input device 18 to execute the operations delineated by an input script. The input script provides the entry data that is necessary when using the software application running on client computer system 14 in order to automatically select policy holder name field 54 and to automatically revise the policy holder name of the example.

The method then terminates at a final step 68.

In tests performed utilizing an embodiment of FIG. 1 of the above-described automated method, improved results were typically observed. The tests were performed using a single general-purpose computer running the Microsoft Windows operating system, wherein both control computer system 12 and client computer system 14 were implemented as processes running on the computer. In an exemplary test, a human operator interacted with multiple screens provided by a software application used for performance of a beneficiary change process in an insurance policy management system. Some application screens needed to be reviewed to verify information visually, and other application screens were used to apply changes utilizing the verified information. The human operator typically required approximately two minutes to complete a specific delineated set of actions. Application of the automated method resulted in identical results in an average of ten seconds, for a typical improvement in efficiency of approximately an order of magnitude.

Alternative Embodiments

Figure 4:
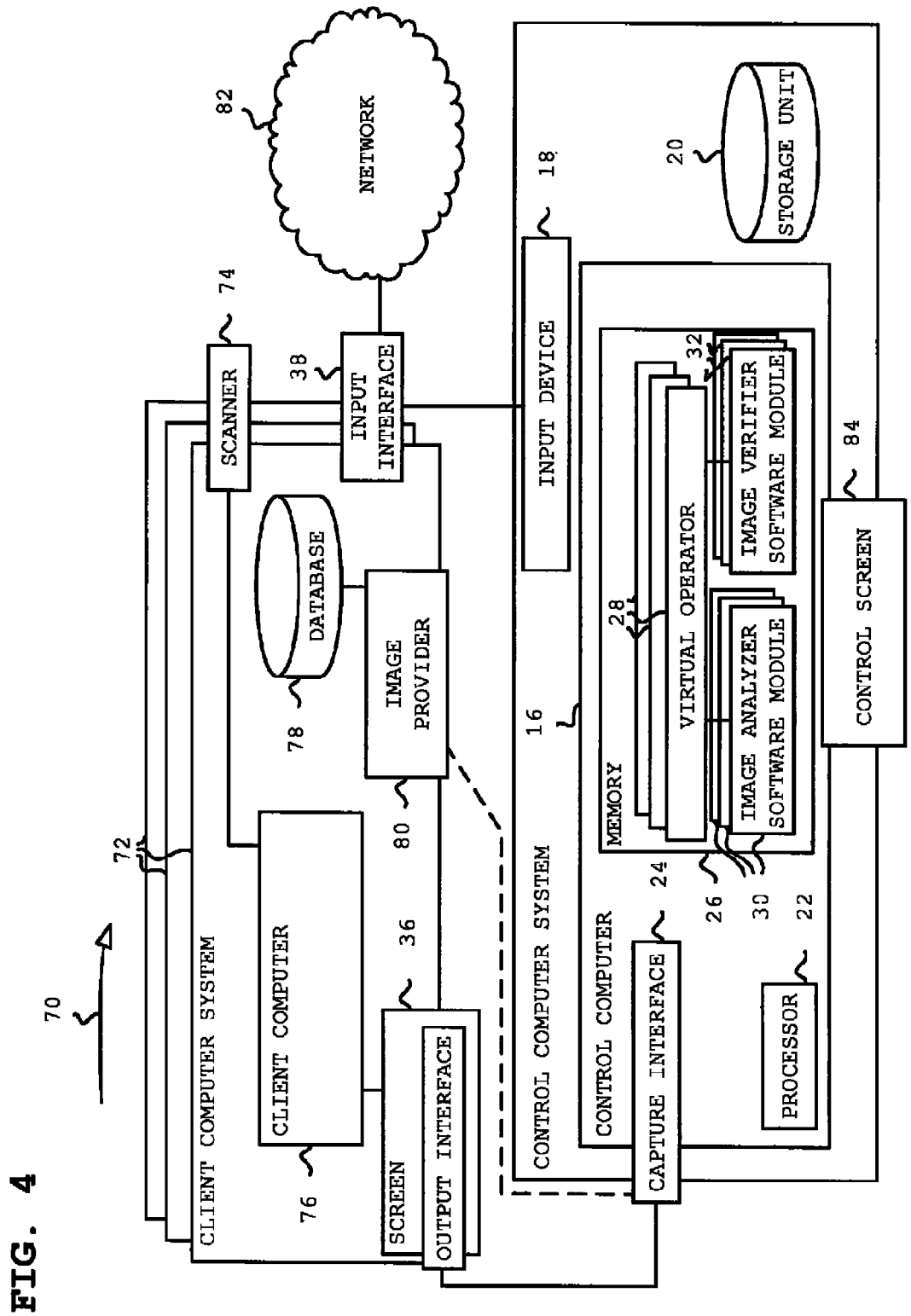
FIG. 4 is a block diagram of a system for automating interaction with a computer system, in accordance with alternate embodiments of the invention.

Reference is now made to FIG. 4, which is a block diagram of an alternative system 70 for automating interaction with a computer system, in accordance with alternate embodiments of the invention. Apart from the differences described below, the operation of alternative system 70 is generally similar to that of system 10 (FIG. 1). As mentioned hereinabove, virtual operator 28 may interface with multiple client computer systems to automatically interact with software applications executing on the multiple client computer systems. In some embodiments, control computer system 12 utilizes additional software modules, e.g., duplicate virtual operator, image analyzer, and image verifier modules. In alternate embodiments, a single instance of each distinct software module is required to interface with the multiple client computer systems and multiple software applications running thereon.

In some embodiments, a client computer system 72 (FIG. 1) captures images from a scanner 74 linked to a client computer 76, and the images are typically stored in a database 78, as described hereinbelow. In an alternative embodiment, images are provided via any conventional image provider 80. In yet another alternative embodiment, captured images are received via a computer network 82 after having been sent as image data over the computer network from a remote computer system.

In an alternative embodiment, a human operator may be used to verify simulated actions of virtual operator 28 (FIG. 1) prior to the entry data being input automatically to the client computer system. For example, when erroneous actions could have harmful effects, or significant risk is incurred by applying updates to the software system, the human operator may perform a review of the entry data on a control screen 84 and may provide a formal approval, before the entry data is entered to the software application, as described hereinbelow.

For purposes of illustration, in an embodiment of the present invention, a software application running on client computer system 72 (FIG. 4) is used to manage back-office services for an insurance provider. The software application provides services comprising receiving payments from customers, associating the payments with insurance policies having outstanding monetary balances, and selectively applying the payments to the balances.

Figure 5:
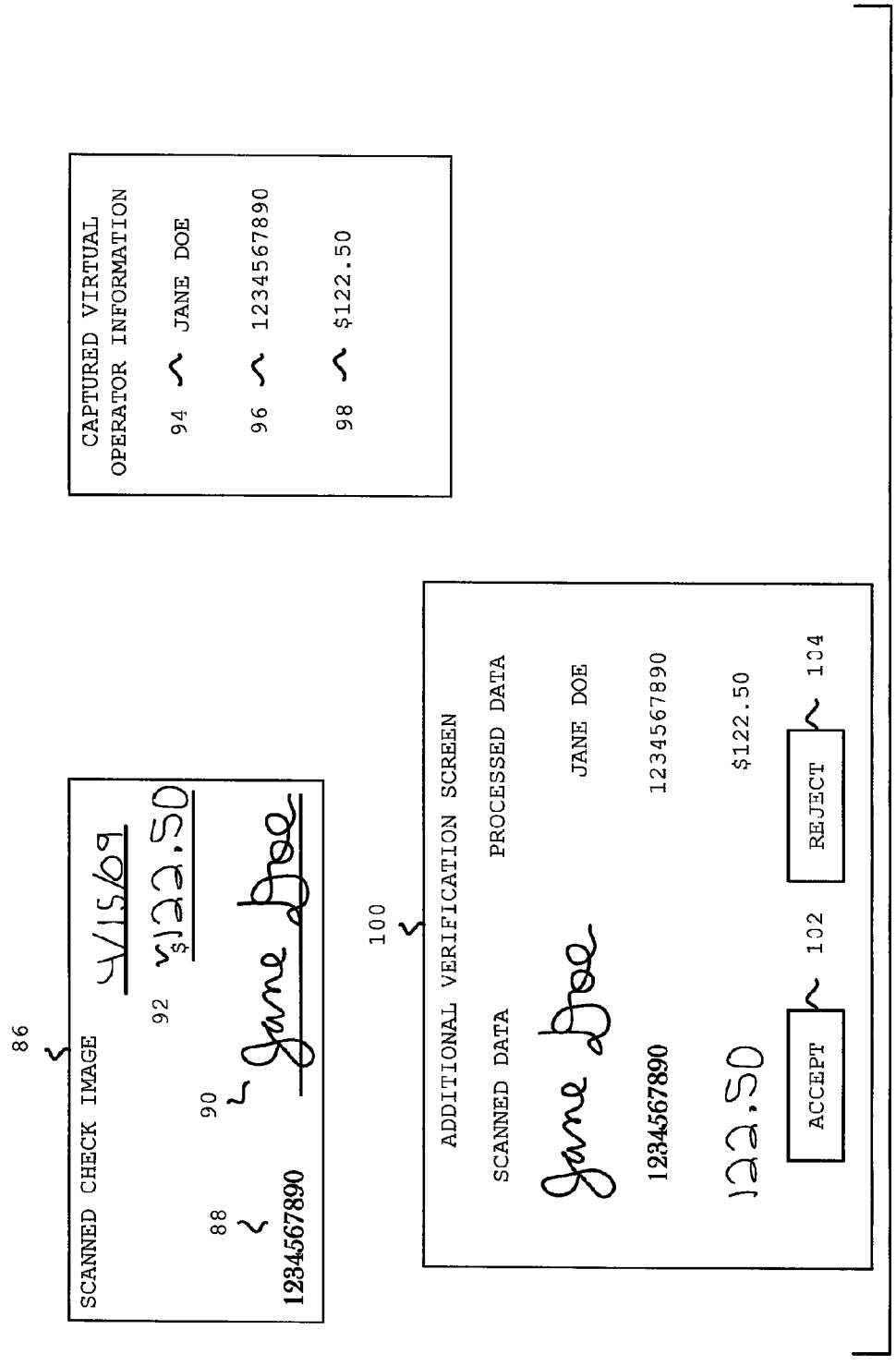
FIG. 5 illustrates scanned and reference images produced by the embodiment of FIG. 4.

Reference is now made to FIG. 5, which is a schematic, pictorial illustration of scanned and reference images using the embodiment of FIG. 4. In the present embodiment, client computer 76 (FIG. 4) scans a check received from a client, and captures a check image 86 using scanner 74, storing check image 86 in database 78. Client computer 76 processes check image 86 and identifies an account number image 88, a bank account owner signature image 90, and a payment amount image 92. The software application processes the images, deriving a bank account owner name 94, ("Jane Doe"), an account number 96, ("1234567890"), and a payment amount 98, ("$122.50"), in the present example.

The software application searches database 78 (FIG. 4) and locates an insurance policy holder, ("Jane Doe"), that matches bank account owner name 94, and provides client computer system 72 with an insurance policy holder listing image, which is substantially similar to image 46 (FIG. 2) for display by client computer 76 on screen 36. The policy holder listing image typically displays the insurance policy number, the name of the customer, or insurance policy holder, and any outstanding monetary balance due. The software application displays check image 86 and the images identified thereupon, in addition to the processed check data, e.g., bank account owner name 94, account number 96, and payment amount 98.

In the present example, virtual operator 28 (FIG. 4) may capture the insurance policy holder listing image from screen 36. Image analyzer module 30 may be used by virtual operator 28 to recognize check image 86 and the images displayed thereupon, account number image 88, bank account owner signature image 90, and payment amount image 92. Virtual operator 28 uses image verifier module 32 to verify that the images match the processed check data, typically stored in database 78 in the present example. Image verifier module 32 matches the images to the processed check data and in response to the matching, virtual operator 28 controls input device 18 to automatically input entry data to client computer system 72 to confirm processing of the check.

In an alternative embodiment of the present invention, after virtual operator 28 (FIG. 4) has simulated the actions of a human operator by confirming that the check should be applied to the insurance policy holder's balance, an additional step may be taken for the purpose of safety. The software application provides an additional verification image 100 to the human operator on control screen 84. Additional verification image 100 comprises the images derived from check image 86, the processed check data, an acceptance button icon 102, and a rejection button icon 104. The human operator can compare bank account owner signature image 90 to bank account owner name 94, for example, and if satisfied, accept the check for payment of the insurance policy by using acceptance button icon 102. Alternatively, rejection button icon 104 may be used by the human operator to reject the check for payment of the balance.

In the previous description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

COMPUTER PROGRAM LISTINGS

```
Listing 1
image=acquire_screen
OCR.recognize(image)
for (text in set of phrases)
    if (text ends_with ":") labels.add(text)
    else                    fields.add(text)
end
for (field in fields)
    label=find_nearest(labels,field)
    associate_field(label,field)
end
Listing 2
Recognize(image)
    black_white_image=binarize(image)   // convert color characters
to b&w binary image
    cclist = find_connected_components(black_white_image)   // red
marks below
    for_each component
        letter=classify(component)
        insert_to_spatial_structure(letter)
    end
    compose_phrases_from_spatial_structure
end
Listing 3
SetField(field_label,value)
    label=find_closest_match(field_label)
    field=retrieve_associated_field(label)
    coords=extract_field_coordinates(field)
    mouse_click(coords)
    generate_keystrokes(value)
end
Listing 4
mouse_click(coords)
    input=create MOUSEINPUT structure
    input.coords=cords
    SendInput(input) // WIN32 API function
end
generate_keystrokes(value)
    for_each character in value
        generate_keystroke(character)
    end
```

COMPUTER PROGRAM LISTINGS

```
end
generate_keystroke(character)
    input=create KEYBDINPUT structure
    input.character=character
    SendInput(input) // WIN32 API function
end
```

The invention claimed is:

1. Computing apparatus, comprising:
a client computer system, which comprises:
   an input interface, configured to receive input signals representative of keystrokes or mouse clicks performed by a human operator of the client computer system;
   a client computer, which is configured to run a legacy software program designed to perform a plurality of different operations, and to generate output images responsively to the input signals and to running of the legacy software program; and
   an output interface, coupled to provide output signals corresponding to the output images; and
a control computer system, which comprises:
   a control interface for communicating with a human operator;
   a storage unit configured with a library of a plurality of input scripts, each input script including data for performing actions tailored to carry out a specific operation by the legacy software program, by simulating interaction of a human operator with the legacy software program;
   a capture interface, which is coupled to receive the output signals from the output interface of the client computer system;
   an input device, which is coupled to generate simulated keystroke or mouse click input signals and provide the generated input signals to the input interface of the client computer system; and
   a control computer, which is configured to run a plurality of software modules, comprising:
      an image analyzer module, which causes the control computer to process the output signals received by the capture interface so as to recognize information in the output images; and
      a virtual operator module, which causes the control computer to cause the input device to provide, to the client computer system, simulated keystroke or mouse click input signals according to one of the input scripts stored in the storage unit, the recognized information in the output images from the client computer system, and instructions from the human operator, received through the control interface,
      wherein the image analyzer module causes the control computer to identify a location of a cursor in at least one of the output images and to produce the simulated keystrokes or mouse clicks responsively to the identified location of the cursor, and
      wherein the plurality of software modules run by the control computer comprise an image verifier module, which causes the control computer to extract a marker from at least one of the output images and to verify, responsively to the extracted marker, that the recognized information matches a known pattern before producing the simulated keystrokes or mouse clicks in response to the at least one of the output images.

2. The apparatus according to claim 1, wherein the image analyzer module causes the control computer to apply optical character recognition (OCR) to the output signals in order to extract textual information from the output images.

3. The apparatus according to claim 1, wherein the image analyzer module causes the control computer to identify and find respective locations of fields in the output images in order to extract the information from the fields.

4. The apparatus according to claim 1, wherein the control interface comprises a control screen, and wherein the control computer is coupled to present on the control screen entry data for review by a human user, and to provide the simulated keystrokes or mouse clicks after receiving approval of the presented data from the human user.

5. The apparatus according to claim 1, wherein the capture interface and the input device of the control computer system are configured to be coupled to receive the output signals and provide the input signals to multiple client computer systems, and wherein the control computer is configured to process the output signals and produce the simulated keystrokes or mouse clicks respectively for each of the multiple client computer systems.

6. A method for computing, comprising:
running a legacy software program on a client computer system, which includes an input interface, configured to receive input signals representative of keystrokes or mouse clicks performed by a human operator of the client computer system, and an output interface, coupled to provide output signals corresponding to output images generated by the client computer system responsively to the input signals and to running of the legacy software program;
coupling an input device configured to generate simulated keystrokes or mouse clicks, to the input interface of the client computer system;
coupling a capture interface of a control computer system to receive the output signals from the output interface of the client computer system;
managing a storage unit configured with a library of a plurality of input scripts, each input script including data for performing actions tailored to carry out a specific operation by the legacy software program, by simulating interaction of a human operator with the legacy software program;
running an image analyzer module on the control computer system, which causes the control computer system to process the output signals received by the capture interface so as to recognize information in the output images;
running a virtual operator module on the control computer system, which causes the control computer system to cause the input device to provide, to the client computer system, simulated keystroke or mouse click input signals in accordance with one of the input scripts stored in the storage unit, the recognized information in the output images from the client computer system, and instructions from a human operator; and
running an image verifier module on the control computer system, which causes the control computer system to extract a marker from at least one of the output images and to verify, responsively to the extracted marker, that the recognized information matches a known pattern before producing the simulated keystrokes or mouse clicks in response to the at least one of the output images,
wherein running the image analyzer module comprises identifying a location of a cursor in at least one of the output images, and wherein running the virtual operator module comprises producing the simulated keystrokes or mouse clicks responsively to the identified location of the cursor.

7. The method according to claim 6, wherein running the image analyzer module comprises applying optical character recognition (OCR) to the output signals in order to extract textual information from the output images.

8. The method according to claim 6, wherein running the image analyzer module comprises identifying and finding respective locations of fields in the output images in order to extract the information from the fields.

9. The method according to claim 6, and comprising presenting on a control screen of the control computer system entry data for review by a human user, and wherein running the virtual operator module comprises providing the simulated keystrokes or mouse clicks after receiving approval of the presented data from the human user.

10. The method according to claim 6, wherein the capture interface and the input device of the control computer system are configured to be coupled to receive the output signals and provide the input signals to multiple client computer systems, and wherein running the image analyzer module and the virtual operator module comprises processing the output signals and producing the simulated keystrokes or mouse clicks respectively for each of the multiple client computer systems.

11. A computer software product, for use on a control computer system coupled to a client computer system, which runs a legacy software program and which includes an input interface, configured to receive input signals representative of keystrokes or mouse clicks performed by a human operator of the client computer system, and an output interface, coupled to provide output signals corresponding to output images generated by the client computer system responsively to the input signals and to running of the legacy software program,
wherein the computer software product comprises a non-transitory computer-readable medium in which program instructions are stored, which instructions, when read by a processor in the control computer system, cause the control computer system:
to manage a storage unit configured with a library of a plurality of input scripts, each input script including data for performing actions tailored to carry out a specific operation by the legacy software program, by simulating interaction of a human operator with the legacy software program;
to receive the output signals from the output interface of the client computer system via a capture interface of a control computer system;
to run an image analyzer module, which causes the control computer system to process the output signals received by the capture interface so as to recognize information in the output images;
to run a virtual operator module, which causes the control computer system to provide simulated keystroke or mouse click input signals in accordance with one of the input scripts stored in the storage unit, the recognized information in the output images from the client computer system, and instructions from a human operator;

to run an image verifier module, which causes the processor to extract a marker from at least one of the output images and to verify, responsively to the extracted marker, that the recognized information matches a known pattern before producing the simulated keystrokes or mouse clicks in response to the at least one of the output images; and to provide the input signals to the input interface of the client computer system, wherein the image analyzer module causes the processor to identify a location of a cursor in at least one of the output images and to produce the simulated keystrokes or mouse clicks responsively to the identified location of the cursor.

12. The product according to claim 11, wherein the image analyzer module causes the processor to apply optical character recognition (OCR) to the output signals in order to extract textual information from the output images.

13. The product according to claim 11, wherein the image analyzer module causes the processor to identify and find respective locations of fields in the output images in order to extract the information from the fields.

14. The product according to claim 11, wherein the instructions cause the processor to present on a control screen, entry data for review by a human user, and to provide the simulated keystrokes or mouse clicks after receiving approval of the presented data from the human user.

* * * * *